(12) United States Patent
Bayram et al.

(10) Patent No.: US 8,374,386 B2
(45) Date of Patent: Feb. 12, 2013

(54) SENSOR FINGERPRINT MATCHING IN LARGE IMAGE AND VIDEO DATABASES

(75) Inventors: Sevinc Bayram, Brooklyn, NY (US); Husrev Taha Sencar, Lyndhurst, NJ (US); Nasir Memon, Holmdel, NJ (US)

(73) Assignee: Polytechnic Institute of New York University, Brooklyn, NY (US)

( * ) Notice: Subject to any disclaimer, the term of this patent is extended or adjusted under 35 U.S.C. 154(b) by 190 days.

(21) Appl. No.: 13/015,451

(22) Filed: Jan. 27, 2011

(65) Prior Publication Data

US 2012/0195476 A1    Aug. 2, 2012

(51) Int. Cl.
    *G06K 9/00* (2006.01)
    *G06F 17/30* (2006.01)
(52) U.S. Cl. .................. 382/100; 382/224; 707/736
(58) Field of Classification Search .................. 382/100, 382/103, 106, 115–121, 155, 162, 168, 173, 382/181, 189–195, 209, 219, 224, 274, 276, 282–295, 305, 312; 250/221; 707/736
See application file for complete search history.

(56) References Cited

U.S. PATENT DOCUMENTS

| | | | |
|---|---|---|---|
| 7,602,935 B2 * | 10/2009 | Nishino | 382/100 |
| 8,148,673 B2 * | 4/2012 | Light et al. | 250/221 |
| 8,194,986 B2 * | 6/2012 | Conwell | 382/224 |
| 8,195,659 B2 * | 6/2012 | Hull et al. | 707/736 |
| 8,238,669 B2 * | 8/2012 | Covell et al. | 382/224 |

* cited by examiner

*Primary Examiner* — Seyed Azarian

(74) *Attorney, Agent, or Firm* — John C. Pokotylo; Straub & Pokotylo

(57) ABSTRACT

Several promising techniques have been recently proposed to bind an image or video to its source acquisition device. These techniques have been intensively studied to address performance issues, but the computational efficiency aspect has not been given due consideration. Considering very large databases, the efficiency of the sensor fingerprint based source device identification technique is described. Novel schemes that improve search complexity as compared to a conventional approach are described.

19 Claims, 12 Drawing Sheets

Table 1. Performance Results

| Camera | Number of Searches | Time | Performance |
|---|---|---|---|
| Panasonic DMC FZ20 | 25 | 6min., 34sec. | 50/50 |
| Canon Powershot A80 | 27 | 6min., 11sec. | 50/50 |
| Canon Powershot S1 IS | 27 | 6min., 47sec. | 48/50 |
| Sony Cybershot S90 | 20 | 6min., 47sec. | 47/50 |
| Sony Cybershot P72 | 31 | 7min., 42sec. | 46/50 |

FIGURE 6

SENSOR FINGERPRINT MATCHING IN LARGE IMAGE AND VIDEO DATABASES

§0. GOVERNMENT RIGHTS

The United States Government may have certain rights in this invention pursuant to a grant awarded by the Air Force Office of Scientific Research. Specifically, the United States Government may have a paid-up license in this invention and the right in limited circumstances to require the patent owner to license others on reasonable terms as provided for by the terms of Grant Number: FA9550-09-1-0087 awarded by the Air Force Office of Scientific Research ("AFOSR").

§1. BACKGROUND OF THE INVENTION

§1.1 Field of the Invention

The present invention concerns sensor fingerprint based source device identification.

§1.2 Background Information

Promising research results have emerged in recent years in identifying the source acquisition device (e.g., camera, video camera, camera enabled smart phone, etc.) of multimedia objects. These efforts have primarily focused on the design of techniques that can identify and extract class properties (the type of color filter array, specifics of the demosaicing technique, type of lens, compression parameters) and individual properties (noise characteristics of the imaging sensor and traces of sensor dust of images and videos). (See, e.g., the articles: J. Lukas, J. Fridrich, and M. Goljan, "Digital Camera Identification From Sensor Pattern Noise," *IEEE Transactions Information Forensics and Security* 1(2), pp. 205-214, (2006); S. Bayram, H. T. Sencar, and N. Memon, "Classification Of Digital Camera Models Based On Demosaicing Artifacts," *Digital Investigation: The International Journal of Digital Formesics & Incident Response*, 5, pp. 49-59, (September 2008); K. S. Choi, E. Y. Lam, and K. K. Y. Wong, "Source Camera Identification Using Footprints From Lens Aberration," *Digital Photography II. Proceedings of the SPIE* 6069, pp. 172-179, (February 2006); A. Swaminathan, M. Wu, and K. J. R. Liu, "Non Intrusive Forensic Analysis Of Visual Sensors Using Output Images," *IEEE Transactions of Information Forensics and Security* 2, pp. 91-106, (March 20070), A. E. Dirik, H. T. Sencar, and N. Memon, "Digital Single Lens Reflex Camera Identification From Traces Of Sensor Dust," *IEEE Transactions on TIFS*, (2008); Z. J. Geradts, J. Bijhold, M. Kieft, K. Kurosawa, K. Kuroki, and N. Saitoh, "Methods For Identification Of Images Acquired With Digital Cameras," *SPIE, Enabling Technologies for Law Enforcement and Security* 4232, pp. 505-512, (February 2001); K. Kurosawa, K. Kuroki, and N. Saitoh, "CCD Fingerprint Method Identification Of A Video Camera From Videotaped Images," *ICIP99*, pp. 537-540, Kobe, Japan, (1999); H. T. Sencar and N. Memon, "Overview Of State-Of-The-Art In Digital Image Forensics", *World Scientific Press*, (2008), each of which is incorporated herein by reference.) Methods to identify the unique fingerprint of a source device (e.g., digital camera) which is present in every image taken with the camera are described in Lukas, Fridrich and Goljan (2006), much like how every gun leaves unique scratch marks on every bullet that passes through its barrel. Furthermore, this unique fingerprint is hard to remove or forge and survives a multitude of operations performed on the image such as blurring, scaling, compression, and even printing and scanning. It can be detected with very high accuracy with false positives and negatives below $10^{-6}$.

Although the existence of multimedia forensics techniques is essential in determining the origin, veracity and nature of media data, with the explosive growth in the amount of media data, a more fundamental question also arises as how to integrate these methods into investigative and forensic settings in a more practical manner. For example, when triaging information from distributed sources, analysts may need to verify whether there are additional copies of a received picture or video that might have been captured by the same camera or camcorder, or may need to find the owner of an anonymized multimedia object containing contraband content. More critically, the analysts may need to find such instances from local databases or open sources, like the Internet for example, very fast.

Consider the following very specific scenarios:

1) The XY Times, the leading newspaper of XY city, receives a set of pictures from a terrorist organization claiming responsibility of a bombing event. The pictures show the scene just before the bomb was triggered thereby establishing complicity of the organization in the crime. A few days later, based on an anonymous tip, law enforcement agents raid a suspected hideout. A detailed forensics search of the computer found in the hideout uncovers no evidence linking the suspects to the crime. However, they find a camera on location whose "fingerprint" obtained by forensics analysis matches the picture sent to XY Times thereby clearly establishing the link between the suspects and the crime;

2) As above, The XY times again gets the same set of pictures for the same event. However, there is no anonymous tip this time. Instead, law enforcement agents now extract an estimate of the camera "fingerprint" from the pictures received by XY Times. They then perform a search for images on the internet, including online photo repositories, which have the same "fingerprint". The search results in the discovery of a few hundred images that were potentially taken from the same camera as the pictures sent to XY Times. Manual inspection of this set leads to a group of pictures on a social media Website account apparently taken at a wedding celebration and depicting adults who fit a suspected profile. More detailed traditional investigation ultimately leads to the arrest of these adults and the breaking up of a major terrorist organization; and 3) A person is apprehended while suspiciously taking pictures of children near an elementary school. He claims to be an amateur photographer pursuing a hobby. The police extract a fingerprint of his camera and search a large database (of millions of images) of known child pornography images. A cluster of such recently reported images is found to match the suspect's camera fingerprint. The suspect is questioned, the child depicted in the pictures is rescued and the suspect is convicted after a short trial and put behind bars.

It should be noted that the problem in the first example above is an instance of the multimedia source "verification" problem, i.e., one is trying to match a given object to a given device. On the other hand, in the second and third scenarios, the task turns into a multimedia source "identification" problem where one has to do a comparison with all the entities in a large database to decide which objects in the database match the query device or the query object.

One solution to the identification problem would be to use multiple one to one comparisons using conventional source verification techniques. However this would require comparisons linear to (on the order of) the size of the database as shown in FIG. 1. For large databases, this is not feasible.

Specifically, conventional source identification techniques can be viewed to include an offline and online step. During the offline step, fingerprints from (1) all the available images and videos and (2) the available source devices are extracted and saved. Typically, the computational requirements of this step are quite intensive; however, since it is done only once per media object, it is surmountable pending on the specifics of the decision scenario. This might include as few as a hundred objects, to large databases of millions of objects. During the online step, a matching decision is sought for the provided media object(s). The computational requirements of the online step will vary depending on the specifics of the decision scenario. For example, when a match between an image and a camera is in question, the computational load may be negligible. On the other hand, when for a given camera fingerprint, all the copies of images taken by the same camera are to be searched over a large database, then the computational load may be determined by the size of the database.

The conventional linear matching methodology, for a given sensor fingerprint associated with a device, operates on each media object individually by correlating the device fingerprint with the fingerprint extracted from each media object. Therefore, computational complexity may be linear in the size of the database. Hence for large databases, no matter how simple the matching operation is, the computational burden will be in the order of the size of database. Since video and image databases today often contain a very large number of objects, identifying source of a media object in a reasonable time duration is desirable. In this paradigm, the online step of the sensor fingerprint matching method has been a bottleneck for real-life retrieval scenarios, and has limited the benefit of the previously developed techniques.

FIG. 1 illustrates a linear search to identify a matching object for a given sensor fingerprint. In FIG. 1, $f_A$ shows the device fingerprint and $p_i$ (i=1, 2 . . . , N) shows the fingerprints of the media objects in the database to be searched.

Although the overwhelming amount of multimedia information is one of the most significant challenges faced by source-device identification techniques, computational scalability has not been a major concern for current the techniques. As a result, even if the above conventional techniques perform quite reliably, their success will be quite limited in applications that involve large databases simply due to the sheer volume of the data and impractical due to computational limitations and time constraints. It would be useful to have techniques that will make source identification, such as in the multimedia forensic analysis described in examples two and three above, practical and effective.

§2. SUMMARY OF THE INVENTION

A new approach to facilitate fast retrieval of media objects exhibiting a given sensor fingerprint from a large database is described. In one exemplary embodiment consistent with the present invention, a method (and apparatus) for facilitating the identification of media objects exhibiting a device fingerprint produced by a target source device is described. The exemplary method includes (a) receiving, by a computer system including one or more computers on network, a first set of media objects created by a plurality of source devices, each of the media objects including a device fingerprint produced by the source device which created the media object, (b) determining, by the computer system, the device fingerprints for each of the media objects in the received first set of media objects, (c) grouping, by the computer system, the device fingerprints determined for each of the media objects based on an analysis of the determined device fingerprints of the media objects, thereby defining groups of one or more device fingerprints, (d) determining, by the computer system, a composite group fingerprint for each group of device fingerprints stored, wherein the composite group fingerprint of each group is determined using the one or more device fingerprints of the media objects which are members of the group, and (e) storing, by the computer system, the groups of device fingerprints and the determined composite group fingerprint for each group on one or more storage devices. Additional exemplary embodiments consistent with the claimed invention may further include (f) receiving, by the computer system, a second set of one or more media objects created by the target source device, each of the media objects in the second set of one or more media objects including a device fingerprint produced by the target source device which created the media object, (g) determining, by the computer system, a query fingerprint of the target source device by analyzing the device fingerprints of the media objects in the second set of one or more media objects created by the target source device, (h) determining, by the computer system, a correlation between the query fingerprint of the target source device and each of the composite group fingerprints, and (i) identifying, by the computer system, all media objects included in the first set of media objects whose device fingerprint matches the query fingerprint of the target source device using the determined correlations.

§3. BRIEF DESCRIPTION OF THE DRAWINGS

FIG. 6 is a table detailing performance results of an experiment using Group Testing with binary search trees.

§4. DETAILED DESCRIPTION

Figure 1:
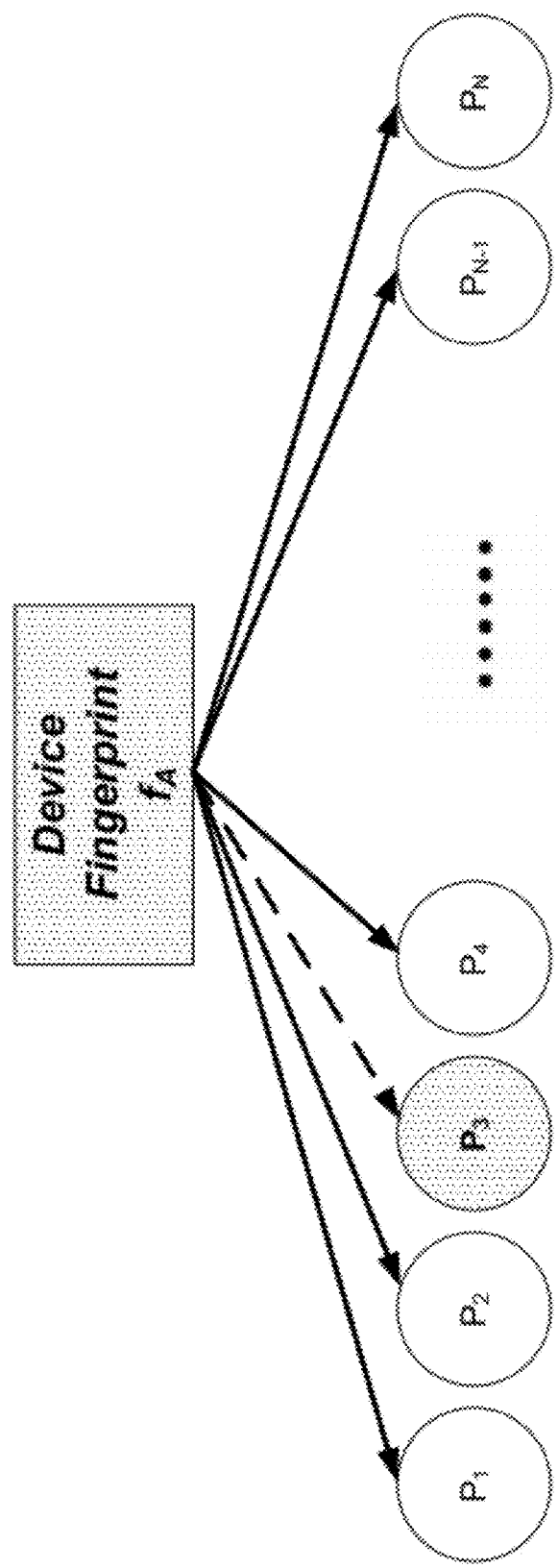
FIG. 1 illustrates a conventional linear image or multimedia device fingerprint matching system.

The present invention may involve novel methods, apparatus, message formats, and/or data structures for fingerprint based source device identification. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. In the following, "information" may refer to the actual information, or a pointer to, identifier of, or location of such information. Thus, the present invention is not intended to be limited to the embodiments shown and the inventors regard their invention to include any patentable subject matter described.

§4.1 EXEMPLARY ENVIRONMENT IN WHICH EMBODIMENTS CONSISTENT WITH THE PRESENT INVENTION MAY OPERATE

Exemplary embodiments consistent with the present invention may solve the multimedia source identification problem in large databases by organizing and indexing a database of camera and media object fingerprint information such that one can quickly and efficiently search only a small part of it to find the objects whose forensics characteristics match the query object within a certain tolerance threshold.

Indexing and searching large collections of data, including images and video, has been a well-studied problem with some remarkable engineering success. However, indexing and querying camera fingerprints poses some unique challenges, including the large dimensionality and randomness of device fingerprints, and a complicated matching procedure that would map the query to the nearest fingerprint. To address these challenges, novel techniques based on the following approaches are described below.

1) Binary Search Trees based on Group Testing: Performing fingerprint matching by performing operations on composite fingerprints derived from groups of objects leads to the possibility of developing binary search trees appropriately indexed by composite fingerprints.
2) Nearest Neighbor Search: Locally Sensitive Hashing ("LSH") techniques, that have been deployed successfully for the nearest neighbor search problem, may be applied to finding matching fingerprints.
3) Clustering: Efficient ways to automatically cluster images based on their unique characteristics may be used so that each device will be represented only once in the database.

Figure 2:
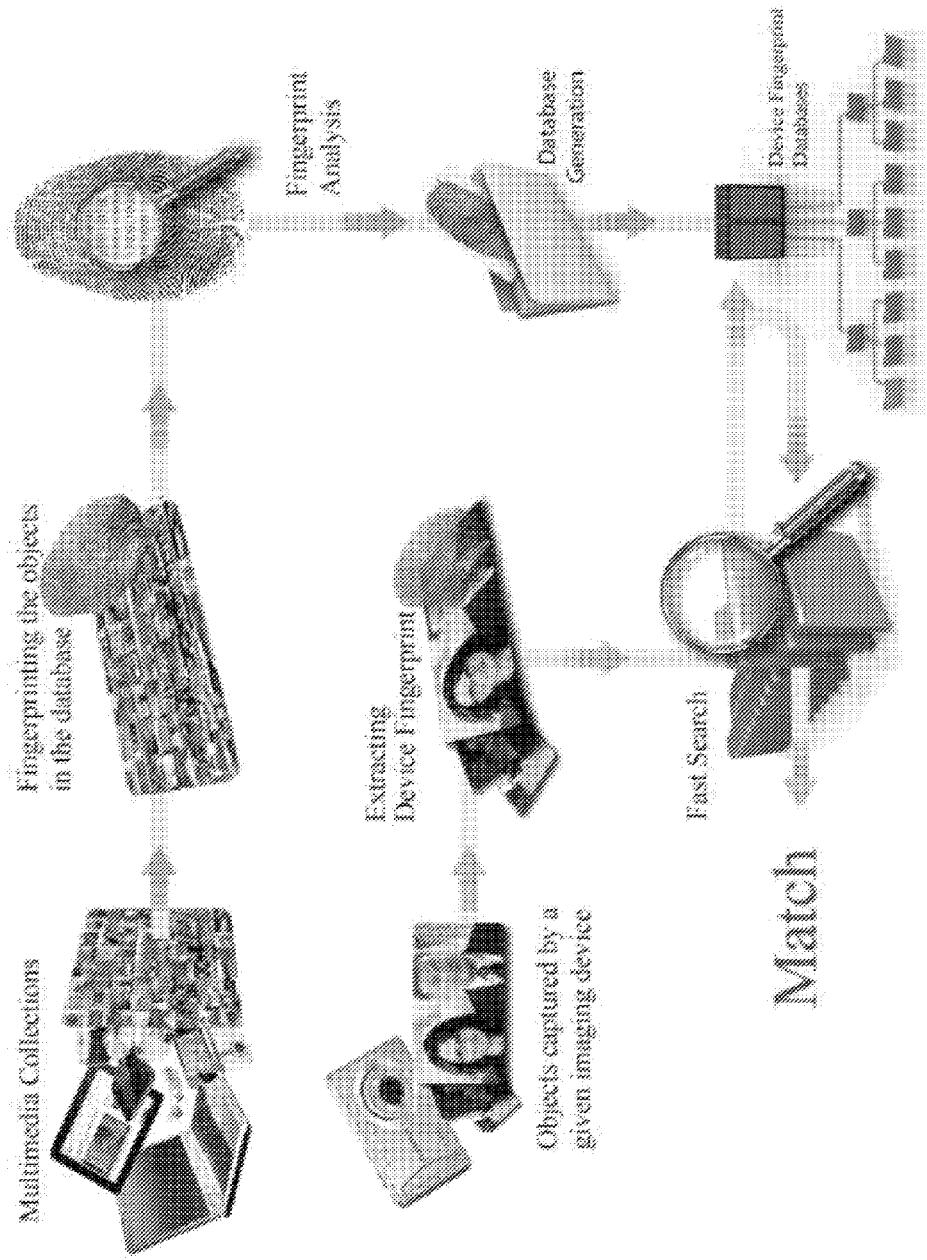
FIG. 2 illustrates an exemplary image multimedia source device identification system consistent with the present invention.

The Multimedia Source Device Identification System shown in FIG. 2 is described below and may be based on the techniques developed using the approaches listed above.

In the following, a background of sensor fingerprint matching is first presented in Section 4.2. Then, exemplary embodiments using the above approaches are described in Section 4.3.

§4.2 SENSOR FINGERPRINT MATCHING BACKGROUND

The primary building block of cameras and camcorders is an imaging sensor that obtains a digital signal representation of the incident light from a scene. Although the sensor technology is quite sophisticated, imaging sensors suffer from random and systematic characteristics that are introduced to the output media object. These characteristics, although imperceptible to humans, get embedded within multimedia data and are essentially a combination of two interrelated factors: first, the class properties that are common among all devices of a brand and/or model; and second, individual properties that set a device apart from others in its class.

Figure 3:
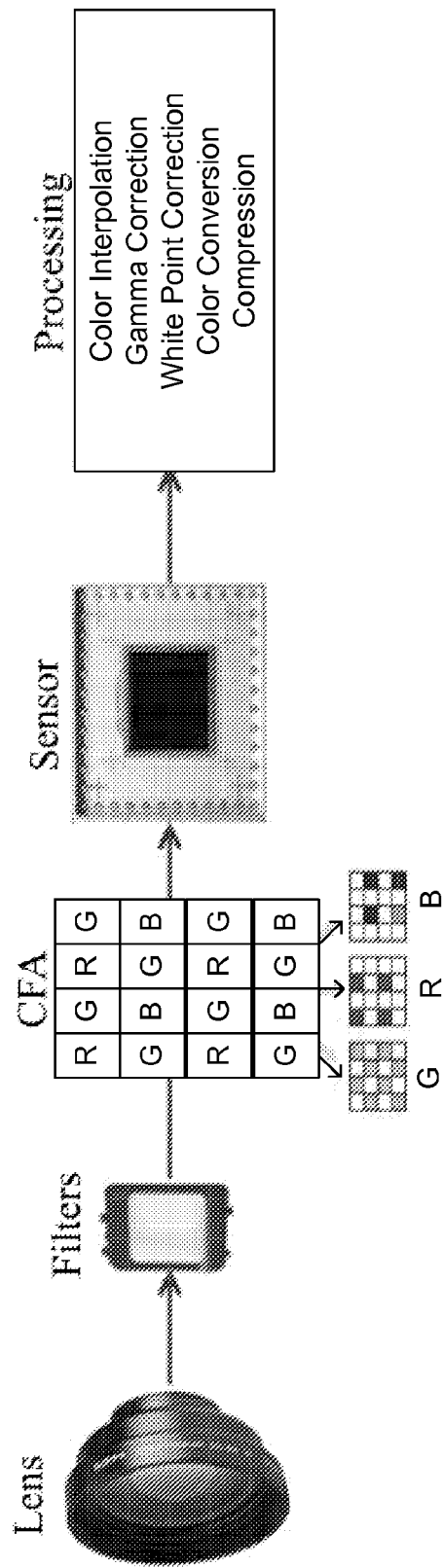
FIG. 3 illustrates a simplified depiction of an imaging pipeline within a camera and the different components consistent with the present invention.

For example, for image data, many approaches have been demonstrated to identify the class of the device that created the image (for example was the picture taken by a Sony® camera versus an iPhone® camera) based on the properties of the components used in the imaging pipeline, such as the type of the color filter array used, the type of lens, compression parameters or the specifics of the demosaicing (interpolation) technique, etc. (See, e.g., the articles: Sevinc Bayram, Husrev Taha Sencar, and Nasir Memon, "Classification of Digital Camera Models Based on Demosaicing Artifacts," *Digital Investigation: The International Journal of Digital Forensics & Incident Response*, 5:49-59, (September 2008); Choi, supra; Yanmei Fang, Ahmet Emir Dirik, Xiaoxi Sun, and Nasir Memon, "Source Class Identification for DSLR and Compact Cameras," *IEEE Workshop on Multimedia Signal Processing*, (2009); H. Farid, "Digital Image Ballistics from JPEG Quantization," *Technical Report TR*2006-583, Department of Computer Science, Dartmouth College, (2006); H. Farid, "Digital Image Ballistics From JPEG Quantization: A Followup Study," *Technical Report TR*2008-638, Department of Computer Science, Dartmouth College, (2008); Mehdi Kharrazi, Husrev T. Sencar, and Nasir Memon, "Blind Source Camera Identification," Proceeding of IEEE ICIP, (2004); Y. Long and Y. Huang, "Image Based Source Camera Identification Using Demosaicking," *IEEE 8th Workshop on Multimedia Signal Processing*, pp. 4190-424, (October 2006); A. Swaminathan, M. Wu, and K. J. Ray Liu, "Non Intrusive Forensic Analysis Of Visual Sensors Using Output Images," *IEEE Transactions of Information Forensics and Security*, 2(1):91-106, (March 2007); and Min-Jen Tsai and Guan-Hui Wu, "Using Image Features To Identify Camera Sources," *Proceedings of the* 2006 *IEEE International Conference on Acoustics, Speech, and Signal Processing (ICASSP* 2006), volume 2, (2006), each of which is incorporated herein by reference.) It has also been also shown that certain unique low-level characteristics of the image, such as the noise like characteristics of the imaging sensor, and traces of sensor dust, can be successfully used in identification of the specific source device used to capture the image (for example was this picture taken with this specific camera). (See, e.g., the articles: Lukas, supra; Ahmet Emir Dirik, Husrev Taha Sencar, and Nasir Memon, "Digital Single Lens Reflex Camera Identification From Traces Of Sensor Dust," *IEEE Transactions on Information Forensics and Security*, 3(3):539-552, (September 2008); Zeno J. M H. Geradts, Jurrien Bijhold, Martijn Kieft, Kenji Kurosawa, Kenro Kuroki, and Naoki Saitoh, "Methods For Identification Of Images Acquired With Digital Cameras," *Proceedings of SPIE: Enabling Technologies for Law Enforcement and Security*, volume 4232, pages 505-512, (2001); Kenji Kurosawa, Kenro Kuroki, and Naoki Saitoh, "CCD Fingerprint Method-Identification Of A Video Camera From Videotaped Images," *ICIP* (3), pages 537-540, (1999), each of which is incorporated herein by reference.) A simplified version of an imaging pipeline is shown in FIG. 3.

Embodiments consistent with the present invention use unique source device verification technique, namely Photo Response Non-Uniformity ("PRNU") noise based camera identification. (See, e.g., the articles: Lukas, supra; M. Chen, J. Fridrich, M. Goljan, and J. Luks, "Source Digital Camcorder Identification Using Sensor Photo Response Non-Uniformity," *SPIE, Electronic Imaging, Security, Steganography, and Watermarking of Multi-media Contents IX* 6505, pp. 1G-1H, (Jan. 28-Feb. 2, 2007) (hereinafter Chen1); M. Chen, J. Fridrich, and M. Goljan, "Digital Imaging Sensor Identification (Further Study)," *Security, Steganography, and Watermarking of Multimedia Contents IX. Proceedings of the SPIE* 6505, p. 65050P, (February 2007) (hereinafter Chen2), each of which is incorporated herein by reference.) The PRNU noise signal within an image is caused mainly by the impurities in the silicon wafers of the charge-coupled device ("CCD") sensor array used to capture the image. These imperfections affect the light sensitivity of each individual pixel and form a fixed noise pattern. Since every image or video frame captured by the same sensor exhibits the same pattern, it has been shown that PRNU noise can be used as the fingerprint of the sensor.

The extraction of an imaging sensor fingerprint from a media object can be realized by a denoising procedure whose parameters are heuristically set to match characteristics of PRNU noise. Since PRNU noise profiles extracted from individual images suffer from many sources of noise (most notably the content itself), extracts from many images may be combined appropriately together to form a more accurate representation of the sensor fingerprint. During detection, previously obtained sensor fingerprints may be compared to individual extracts from media objects using either correlation (See Lukas, supra and Chen1, supra.), or a correlation predictor (See Chen2, supra.).

In the rest of this section, the basic sensor output model, the estimation of PRNU process, and the matching methodology are summarized.

§4.2.1 Imaging Sensor Output Model

In a digital imaging device, the light entering the camera through its lens is first filtered and focused onto sensor (e.g. CCD) elements which capture the individual pixels that comprise the image. The sensor is the main and most expensive component of a digital imaging device. Each light sensing element of the sensor array integrates the incident light and obtains an digital signal representation of the scenery. Generally, the sensor elements are monochromatic, therefore for each pixel one color value is captured; typically red green, and blue ("RGB"). Later, a demosaicing operation takes place to calculate the missing color values. This is followed by the white balancing operation, colorimetric interpretation, and gamma correction. After these, noise reduction, anti-aliasing and sharpening are performed to avoid color artifacts. At the end the image/video is compressed and saved in the device's memory. (See, e.g., Jim Adams, Ken Parulski, and Kevin Spaulding, "Color Processing in Digital Cameras," *IEEE Micro*, 18:20-30, (1998), incorporated herein by reference.) However, embodiments consistent with the present invention should be operable even if some of these processes are not performed, of if they are performed in an order other than the order shown.

For every color channel, the digital signal representation before demosaicing is denoted as I[i], and the incident light intensity as Y[i], where i=1, . . . , n specifies a specific pixel. Below, all the matrixes shown in bold fonts are in vector form and all the operations would be element-wise. A simplified model of the sensor output model can then be written as:

$$I = g^{\gamma} * [(1+K)Y + \Lambda]^{\gamma} * \Theta_q \qquad (1)$$

In the above equation, g denotes the color channel gain and γ is the gamma correction factor which is typically γ≈0.45. The zero mean noise-like signal responsible for PRNU is denoted by K. This signal is called the sensor fingerprint. Moreover, Λ denotes the combination of all other additive noise sources such as dark current noise, shot noise and read-out noise. Finally, $\Theta_q$ denotes the quantization noise. To factor out the most dominant component light intensity Y from this equation, the Taylor expansion $(1+x)^\gamma = 1+\gamma x + O(x^2)$ an be used, yielding:

$$I = (gY)^\gamma \cdot \left[1 + K + \frac{\Lambda}{Y}\right]^\gamma + \Theta_q = (gY)^\gamma \cdot \left(1 + \gamma K + \gamma \frac{\Lambda}{Y}\right) + \Theta_q \qquad (2)$$

Finally, to simplify the notation and to reduce the number of symbols, γ can be absorbed into the PRNU factor K and the sensor output model can be written as:

$$I = I^{(0)} + I^{(0)}K + \Theta \qquad (3)$$

where $I^{(0)} = (gY)^\gamma$ is the sensor output in the absence of noise $I_{(0)}K$ is the PRNU noise term, and $\Theta = \gamma I^{(0)} \Lambda/Y + \Theta_q$ is the composite of independent random noise component.

§4.2.2 PRNU Noise Estimation

To get a reliable estimation of sensor fingerprint K, the camera in question or a collection of images taken by the camera is needed. Assume that L images are available from the camera. A denoised version of the image I is obtained using a denoising filter F, $\hat{I}^{(0)} = F(I)$. (See, e.g., M. K. Mihcak, I. Kozintsev, K. Ramchandran, and P. Moulin, "Low-Complexity Image Denoising Based On Statistical Modeling Of Wavelet Coefficients," 6(12):300, (December 1999), incorporated herein by reference.) To find a reliable estimate of the PRNU, $\hat{I}^{(0)}$ should be removed from both sides of Equation 3 to improve the signal to noise ratio between $I^{(0)}$ K and I.

$$W = I - \hat{I}^{(0)} = IK + I^{(0)} - \hat{I}^{(0)} + (I^{(0)} - I)K + \Theta = IK + \Xi \qquad (4)$$

The noise term Ξ is a combination of Θ, and the two terms introduced by the denoising filter. This noise can be non-stationary in the textured areas, therefore images with smooth regions help to obtain better PRNU estimates. The estimator for sensor fingerprint K from L images $I_1, I_2, \ldots, I_L$, along with the gaussian noise terms with $\sigma^2$ variance $\Xi_1, \Xi_2, \ldots, \Xi_L$ can then be written as:

$$\frac{W_k}{I_k} = K + \frac{\Xi}{I_k}, \; W_k = I_k - \hat{I}_k^{(0)}, \; \hat{I}_k^{(0)} = F(I_k) \qquad (5)$$

where k=1, 2, . . . , L. Finally the Maximum Likelihood estimate of sensor fingerprint $\hat{K}$ can then be written as:

$$\hat{K} = \frac{\sum_{k=1}^{L} W_k I_k}{\sum_{k=1}^{L} (I_k)^2} \qquad (6)$$

Figure 4:
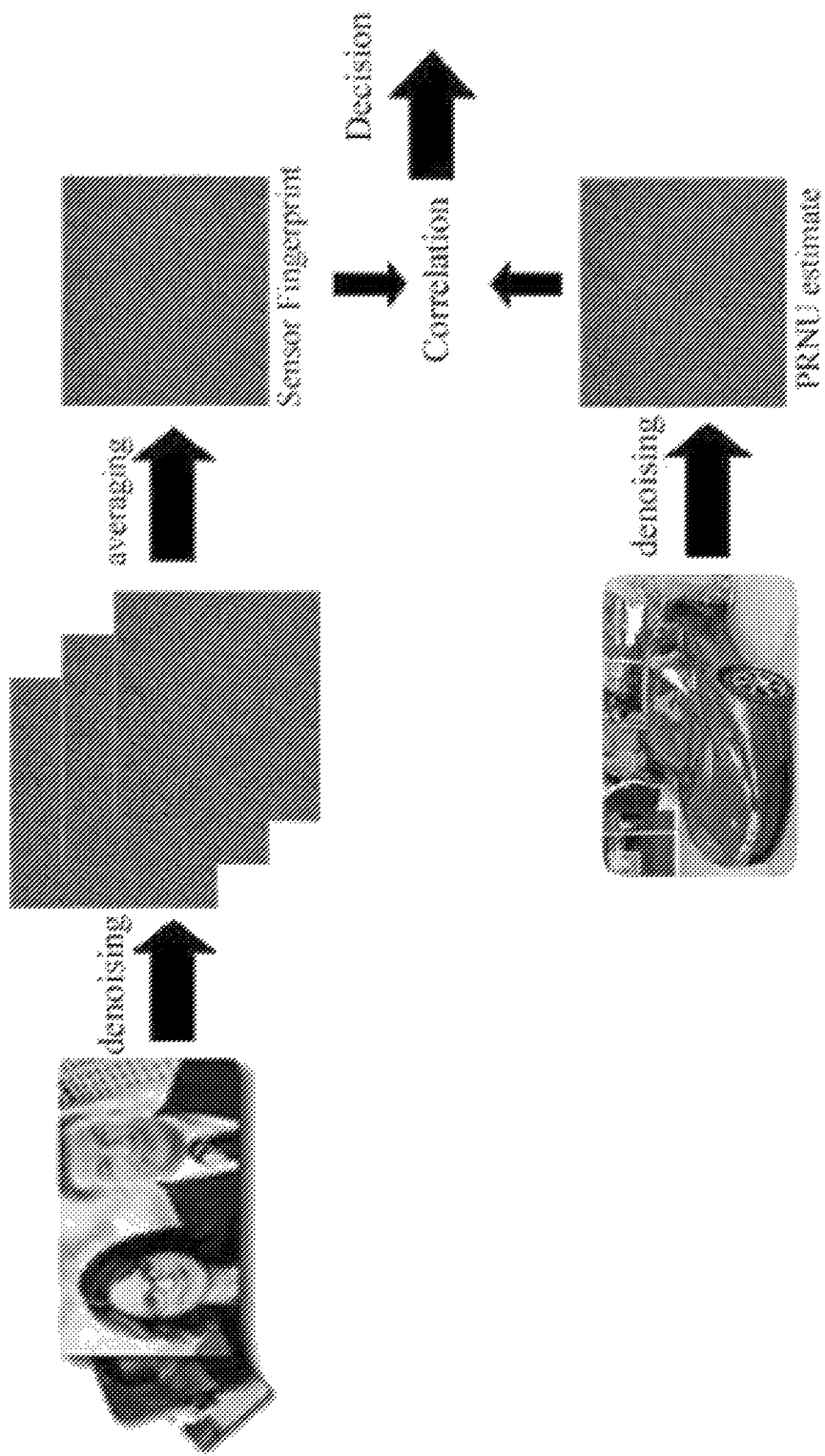
FIG. 4 illustrates an exemplary Photo Response Non-Uniformity ("PRNU") extraction and verification process consistent with the present invention.

The top row of FIG. 4 shows the PRNU noise estimation process. This estimate is referred to as the "fingerprint" of the camera. Every image taken by a specific camera will have this PRNU as part of the image which would uniquely identify the camera.

§4.2.3 Verification with PRNU

In the previous section, a procedure for estimating a camera's fingerprint was described. Now, given a camera with fingerprint K and a query image, the presence of K in the query would indicate that the image was captured by the given camera. To determine if K is present in image I, it is denoised with the same denoising filter F. The PRNU estimate of the image therefore is $W=I-F(I)$. The detection problem can be formalized as a binary hypothesis test, where $H_0$: $W=\Xi$ and $H_1$: $W=I\hat{K}+\Xi$. The optimal detector would be the normalized correlation under the assumption that the noise $\Xi$ is independent and identically distributed ("iid") with unknown variance $\rho=\langle I\hat{K},W\rangle$. The matching decision can be made by comparing p with a predetermined threshold, th. The bottom row of FIG. 4 shows the verification process.

This noise estimate extracted from the query image is matched with the "fingerprint" of the camera. If there is a match, then the query image is declared to have been taken from the specific camera whose fingerprint it matched.

§4.2.4 Robustness of PRNU and Anti-Forensics

PRNU noise is caused by manufacturing defects which cannot be totally eliminated. Therefore, all multimedia objects produced by a sensor exhibit a PRNU noise. In addition, the probability of two sensors exhibiting same PRNU is very low due to the large size (typically larger than $10^6$) of PRNU noise signals and random nature of PRNU noise. Suppression of PRNU requires an operation called flat-fielding which in essence can be only realized by creating a perfectly lit scene within the device. However, obtaining a uniform sensor illumination in a camera is not trivial, therefore the PRNU noise cannot be fixed easily. All these facts make the PRNU a good candidate as a sensor fingerprint.

The robustness properties of PRNU (if it can survive common image processing operations and/or attacks) have been examined in Kurt Rosenfeld and Husrev T. Sencar, "A Study Of The Robustness Of PRNU-Based Camera Identification," *In Media Forensics and Security*, page 72540, (2009) (incorporated herein by reference). This study showed that PRNU is highly robust against denoising, JPEG compression and out of the camera demosaicing. Other studies further removed the effects of demosaicing, JPEG compression and gamma correction type of common image processing operations by a series of post-processing operations on PRNU estimates. (See, e.g., the articles: Mo Chen, Jessica J. Fridrich, Miroslav Goljan, and Jan Lukas, "Determining Image Origin And Integrity Using Sensor Noise," *IEEE Transactions on Information Forensics and Security*, 3(1):74-90, (2008); T. Filler, J. Fridrich, and M. Goljan, "Using Sensor Pattern Noise For Camera Model Identification," *In Proceedings IEEE, International Conference on Image Processing, ICIP* 2008, pages 1296-1299, San Diego, Calif., (Oct. 12-15, 2008); and Miroslav Goljan, "Digital Camera Identification From Images—Estimating False Acceptance Probability,"*IWDW*, pages 454-468, (2008), each of which is incorporated herein by reference.) Furthermore, Gloe, et al, showed that even after scaling and cropping PRNU can be detected given that the right alignment can be found by a brute force search. (See, T. Gloe, M. Kirchner, Antje Winkler, and Rainer B"ohme, "Can We Trust Digital Image Forensics?,"*ACM Multimedia*, pages 78-86, (2007), incorporated herein by reference.) Finally, in Goljan, et al., PRNU detection on printed images has been investigated. It has been shown that PRNU can survive even after high quality printing and scanning cycle. (See, e.g., Miroslav Goljan, Jessica Fridrich, and Jan Lukas, "Camera Identification From Printed Images," *Proceedings of SPIE*, 6819:68190 I, (2008), incorporated herein by reference.)

§4.3 EXEMPLARY METHODS AND OPERATIONS

Figure 11:
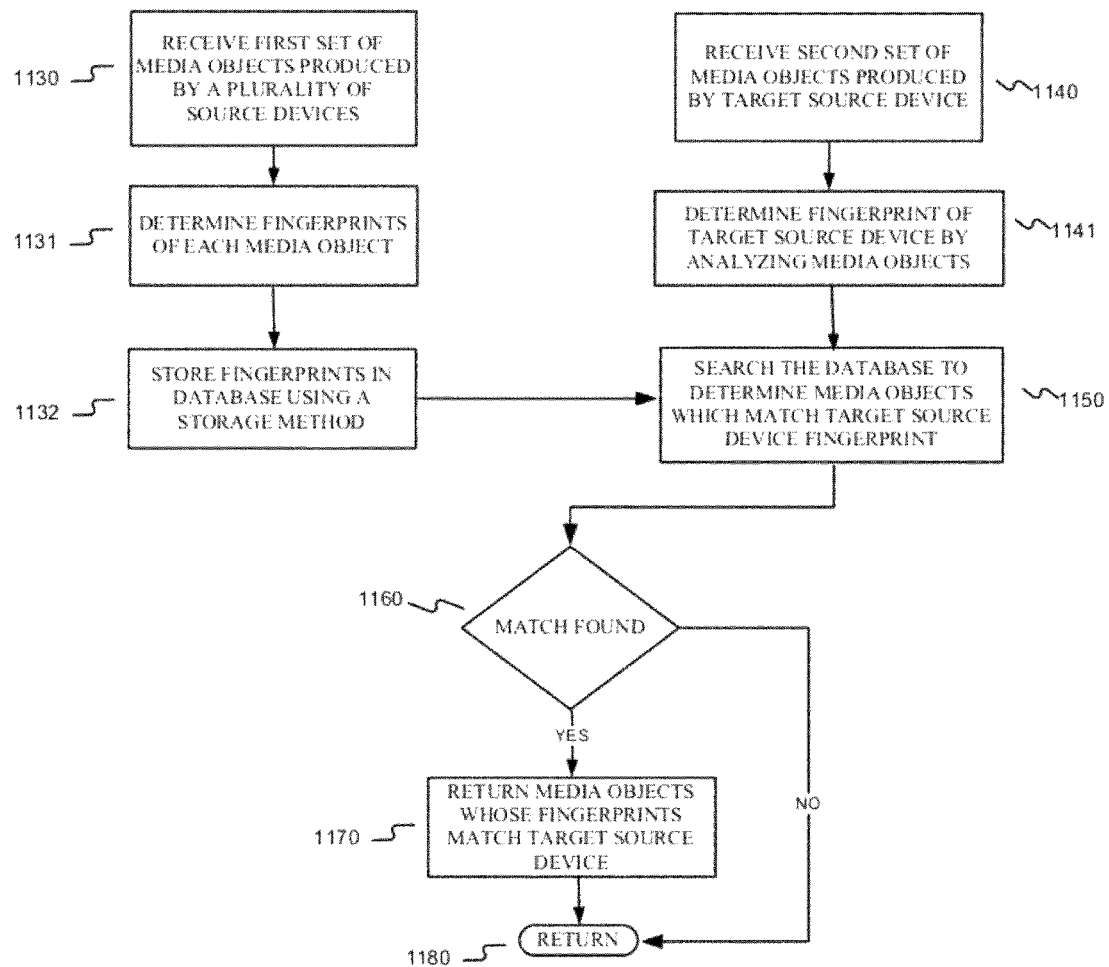
FIG. 11 is a flow diagram of an exemplary method for identifying media objects exhibiting a sensor fingerprint produced by a target source device in a manner consistent with the present invention.

FIG. 11 is a flow diagram of one exemplary method 1100 consistent with the present invention for identifying media objects exhibiting a sensor fingerprint produced by a target source device. A networked computer system, for example, may receive a first set of media objects produced by a plurality of source devices (Block 1130). Fingerprints may then be determined for each of the media objects in the received first set of media objects (Block 1131). Each of the sensor fingerprints for each of the media objects in the received first set of media objects may be stored in one or more databases, for example (Block 1132). A second set of media objects produced by a target source device may be received (Block 1140). A sensor fingerprint of the target source device by then be determined by analyzing the sensor fingerprints of the media objects in the second set of media objects created by the target source device (Block 1141). The determined fingerprint of the target source device is then used to search the database of fingerprints of the first set of media objects (Block 1150). If one or more matches are found, all media objects which match the fingerprint of the target source device are identified/returned (Blocks 1160 and 1170). The method 1100 may then be left. (Block 1180) If no matches are found, the method 1100 may then be left. (Blocks 1160 and 1180).

The description of how the fingerprints of media objects may be stored and searched (Blocks 1132 and 1150) are described in the following. Specifically, the following approaches are described: (1) Binary Search Trees based on Group Testing; (2) Nearest Neighbor Search; and (3) Clustering.

For each of the sections below, a database D is used, which is comprised of N multimedia objects along with their forensically distinctive characteristic vectors $p^i \in R^n$ ($i=1, \ldots, N$), where n is the size of the vector. For each of the approaches described, the task is to determine which of these objects captured by the query device A with the forensics characteristic $f_A \in R^n$.

§4.3.1 Binary Search Tree Structure Based on Group Testing

Embodiments consistent with the present invention concern binding a media object to its source device (i.e., the device which created the media object) with the assumption that a very large number of media objects are considered when identifying potential matches, as well as reducing the search time involved in identifying potential matches. This may be accomplished, for example, by doing matching on a group rather than individual basis. That is, during the search phase, rather than checking the match of a sensor fingerprint to media objects individually (i.e., linearly), performing the match in groups (i.e., "group testing").

A "group test" is a test on an arbitrary group of items that can give one of two outcomes, positive or negative. The outcome is negative if and only if all the items in the group test negative. Group testing has been used in many applications to efficiently identify rare events in a large population. (See, e.g., the articles: Hong-Bin Chen and Hung-Lin Fu, "Nonadaptive Algorithms For Threshold Group Testing," *Discrete Appl. Math.*, 157:1581-1585, (April 2009); and R. Dorfman, "The Detection Of Defective Members Of Large Populations," *The Annals of Mathematical Statistics*, (14):436-440, (1943), each of which is incorporated herein by reference.) It also has been used in the design of a variety of multi-access communication protocols where multiple users are simultaneously polled to detect their activity. In this section, group testing techniques are used to propose the design for a source device identification system that can potentially be used with a large collection of multimedia objects.

Consider the very primitive fake coin problem example. Given eight coins, one of which is fake (positive), how does one determine the fake coin, given that the fake coins weigh less than the genuine ones. If the coins are divided into two groups, and each group is weighed, the group containing the fake coin should weigh less. Therefore, one can determine right away which group has the fake coin. This group can be further divided into two groups and continue scaling until the fake coin is found with only a logarithmic number (with respect to the total number of coins) of weighings.

Now similar to approach above, given a query imaging sensor fingerprint, rather than checking for a match with each object in the database, the match can be performed with PRNU estimates that are combined together to form a composite fingerprint. Specifically, consider a case in which eight PRNU noise estimates ($\{p_1, p_2, \ldots, p_8\}$) obtained from eight images in our database. Also assume that PRNU estimate ($p_3$) has been extracted from an image captured by the camera A. Note that this PRNU estimate will be the noisy version of the camera sensor fingerprint ($p_3 = f_A + \Xi$). Specifically, consider a case where there exists eight PRNU noise estimates ($\{p_1, p_2, \ldots, p_8\}$) obtained from eight images in the database. Also assume that PRNU estimate ($p_3$) has been extracted from an image captured by the camera A. Note that this PRNU estimate will be the noisy version of the camera sensor fingerprint ($p_3 = f_A + \Xi$). If the PRNU estimates are divided into two subsets, one can obtain a composite representation for each by summing up the PRNU noises within the subsets. Therefore, the first composite would be $C_1 = \Sigma_{i=1}^{4} p_i$ and the second composite will be $C_2 = \Sigma_{i=5}^{8} p_i$.

Figure 5:
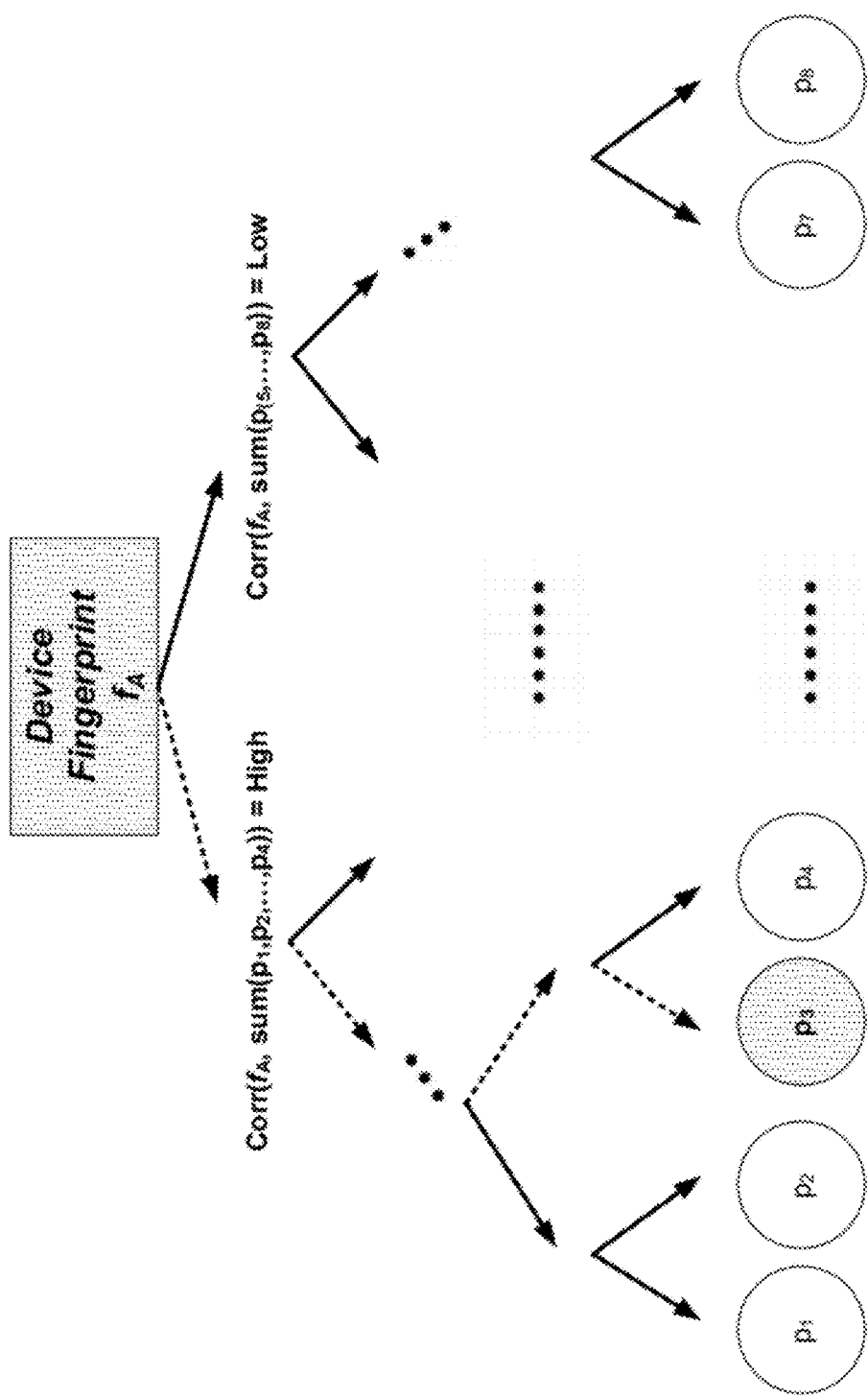
FIG. 5 illustrates an exemplary binary search tree used for Group Testing consistent with the present invention.

Thus, the composite fingerprint which contains the fingerprint of the device $p_3$, in this case $C_1$ will yield a better match with the device's fingerprint, $f_A$, as opposed to $C_2$. That is $E[\rho(C_1, f_A)] > E[\rho(C_2, f_A)]$. This can be carried out further by decomposing the first subset into two groups and a binary search tree can be constructed. FIG. 5 illustrates the binary search tree created in this way. The leaves of the tree represents the PRNU noise estimates $p_i$ ($i=1, 2, \ldots, 8$) of the media objects and the parent nodes represent the sum of their children. The matching image (corresponding to fingerprint $f_A$ which is $p_3$ in this case) is identified by traversing the branches of the search tree, from top to bottom, picking the node that yields the highest correlation at each level.

In FIG. 5, the hashed arrows depict the route the process follows before identifying $p_3$ at the leaf of the tree. Note that, even if there were no objects from the device in question in the database, this method would return an output. However, it will be accepted as a match only if the correlation value between the fingerprint of the device and the leaf object's PRNU estimate is higher than a threshold, th. The binary search tree constructed in this way will yield a logarithmic reduction in identification complexity. For example, if the database had one million media objects, performing the matching procedure 2×(20−1)=38 times will ensure identification of a media object that matches a given device fingerprint. This is a significant reduction as compared to performing a million individual matchings.

§4.3.1.1 Building the Binary Search Tree by Hierarchical Clustering

In this section, an exemplary method to build the BST is described. In building the BST, it is desirable that media objects captured by the same device are located close in the tree. One way to accomplish this is to correlate each single PRNU noise estimate with the rest of the database and sort them according to the correlation results. However, building the tree like this would take $O(nN^2)$ correlations and therefore would not be feasible.

Figure 12:
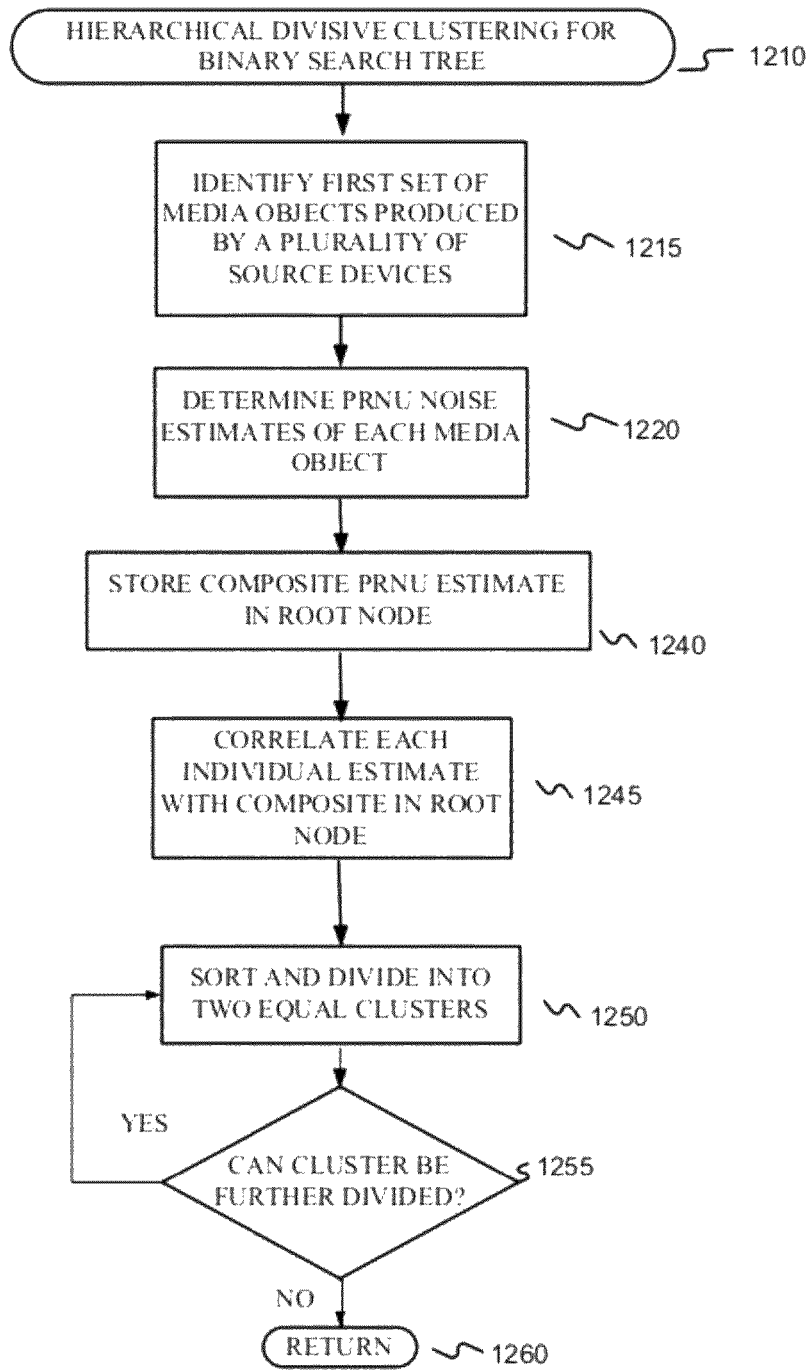
FIG. 12 is a flow diagram of an exemplary method for building a binary search tree using hierarchical divisive clustering in a manner consistent with the present invention.

A more efficient method to build the tree is based on hierarchical divisive clustering as described with reference to FIG. 12. The divisive clustering process starts at the top level with all the entities in one cluster (Block 1240). This top level cluster is split using a flat clustering process (Block 1245). This procedure is applied recursively until each entity is in its own singleton cluster (Block 1250 and 1255). The root of the tree contains a composite PRNU estimate which is obtained by summing all the PRNU estimates in the database, $C = \Sigma_i^N p_i$ (Block 1240). Each individual estimate is then correlated with this composite (Block 1245). The estimates are sorted and divided into two equal sized clusters based on their correlation values (Blocks 1250 and 1255). Thus, if there are more than one media objects from the same device, then the correlation value of the corresponding PRNU estimates with the composite fingerprint should be close to the same. Given m objects from device A in our database $\{p_j = f_A + \Xi_j; j=1, 2, \ldots, m\}$, the correlation between composite fingerprint C with a single PRNU estimate of camera A can be shown as:

$$\rho(C, p1) = \left\{ (f_A + \Xi_k), \sum_{j=1}^{m} (f_A + \Xi_j) \right\} = m\|f_A\|^2 + \Xi_k \sum_{j=1}^{m} \Xi_j \quad (7)$$

Using this fact, the PRNU estimates in the database are sorted according to their correlation results. It is expected that the PRNU estimates of images from the same device will be listed in succession after the sorting operation. Then, the database is split into two subsets and this process is repeated in every level within each subset. This makes the complexity of tree building method as $O(nN\log N)$.

§4.3.1.2 Retrieving Multiple Objects

The exemplary BST based identification method described above can be used to retrieve a media object. However, there might be several media objects in the database that were captured by the same device. The search procedure described herein may also accommodate operations like retrieving several media objects captured by the same imaging device. To retrieve all the media objects captured by the same device, the tree may need to be updated after every search. Specifically, after a match is determined, to retrieve additional objects the most recently matched PRNU noise estimates are subtracted from the composite fingerprints of all the parent nodes. (In FIG. 5 this is equivalent to subtracting PRNU estimate associated with $p_3$ from all the nodes in the path depicted with red arrows.) The tree can be restored to its initial form, when the search for one device is ended.

In a forensics setting, where it is important to limit the false positives, the update and search operations can be repeated consecutively until the search yields a PRNU noise whose correlation with the given fingerprint is lower than the preset threshold. Considering a database of a million PRNU noise estimates and assuming 50 of them are generated by the same device, 38*50=1900 correlations are computed. This is still significantly lower than a million. On the other hand, this method can be used in a retrieval setting. In this case, rather than setting a threshold for the correlation value, the number of searches can be pre-determined. By this way, one can retrieve as many objects as wanted and eliminate the false positives according to threshold later.

For example, in FIG. 5, the retrieved PRNU noise is $p_3$. While updating the tree, $p_3$ should be subtracted from all of the nodes in the route that was depicted by red arrows. Then, the search in the tree can be conducted in the same way again. The update can be repeated until there are no PRNU noise estimates whose correlation with device's fingerprint is higher than the threshold.

§4.3.1.3 Experimental Results Using Group Testing with BSTs

To demonstrate the performance and efficiency of proposed approach, results corresponding to different experimental scenarios are provided below. Three hundred (300) images from five (5) different digital cameras, including a Canon Powershot A80, Sony Cybershot S90, Sony Cybershot P72, Canon Powershot S1 IS, and Panasonic DMC FZ20 at their native resolutions were collected. In addition, 17,000 images from the Internet were downloaded. All images were cropped to the size of 1024×768 to have a fixed resolution. As a part of the offline step, PRNU noises were extracted from all the images and saved in a database to be used in the online step. In the following experiments, the performance of the proposed approach is presented under different settings.

§4.3.1.3.1 First Experiment

The first experiment is designed to evaluate the efficiency of the proposed method when the fingerprint of the sensor in question is present and there is only one image in the database exhibiting this fingerprint. For this purpose, a database of 1024 images was built containing only one image from each camera and 1019 images from the Internet. The fingerprints of the devices from 200 PRNU noise profiles associated with each device were obtained.

With the conventional approach, where the device fingerprint is correlated with the PRNU estimate of each image, it took 7 minutes and 11 seconds to find an image captured by one of the devices. Using Group Testing with a search tree consistent with the present invention, it took 9.61 seconds. There were no false positives in either case.

§4.3.1.3.2 Second Experiment

Figure 7:
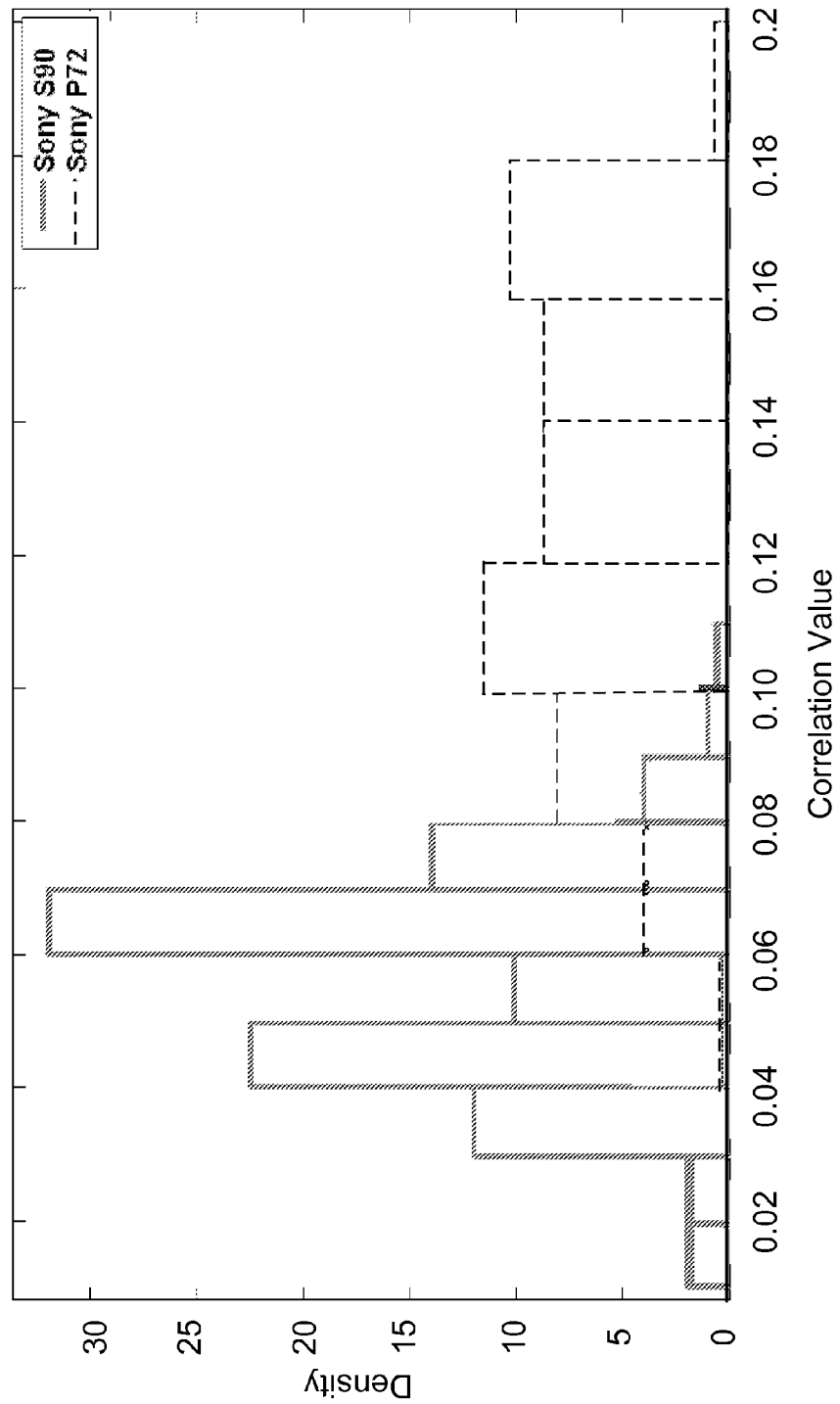
FIG. 7 is a graph illustrating the distribution of correlation values using the fingerprint of Sony Cybershot P72 and the PRNU noise estimates from Sony Cybershot S90 and Sony Cybershot P72.

In the second experiment, a database of 16,384 images was built by mixing 50 images from each camera with the images from the Internet. The objective of the second experiment was to measure the performance and efficiency of Group Testing using a search tree as proposed in identifying as many images as possible while minimizing false matches (i.e., false positives). For this purpose, the threshold was set for the correlation value to 0.12. Sensor fingerprints of the devices were again obtained using 200 PRNU noise profiles from a camera. The search is repeated until a PRNU noise with a correlation lower than the threshold is found. Table 1 in FIG. 6 shows the number of searches, the time and the number of images that were detected with the Group Testing method. In Table 1 of FIG. 6, it can be seen that the errors primarily involve Sony made cameras. This is a result of high correlation between the sensor fingerprints of the two Sony camera models. To further test this phenomenon, in FIG. 7, the distribution of the correlation values between the fingerprint of Sony P72 with the PRNU estimates of itself and of Sony S90 are presented. Results show that to minimize the error one needs the further increase the threshold value. This observation is also in line with the results presented in J. Fridrich and T. Filler, "Using Sensor Pattern Noise For Camera Model Identification," Proc. ICIP 2008, (Oct. 12-15 2008) (incorporated herein by reference), where it is shown that fingerprints of cameras from same manufacturer correlate better with each other due to use of similar demosaicing algorithms. Thus, the demosaicing algorithms can be considered a systematic artifact in the extracted PRNU noise profiles. Further improving these results is possible by removing such demosaicing artifacts from the PRNU noise profiles during the offline step. Table 1 of FIG. 6 also shows that to identify 50 images, one doesn't need to perform 50 searches as the PRNU noises of the same devices were mostly placed in the neighboring leaves of the tree. In this case, the average time to detect 50 images was around 6 minutes and 40 seconds with the proposed method. On the other hand, when a linear search (i.e., conventional method) is performed, it would take more than 2 hours.

§4.3.1.3.3 Third Experiment

Figure 8:
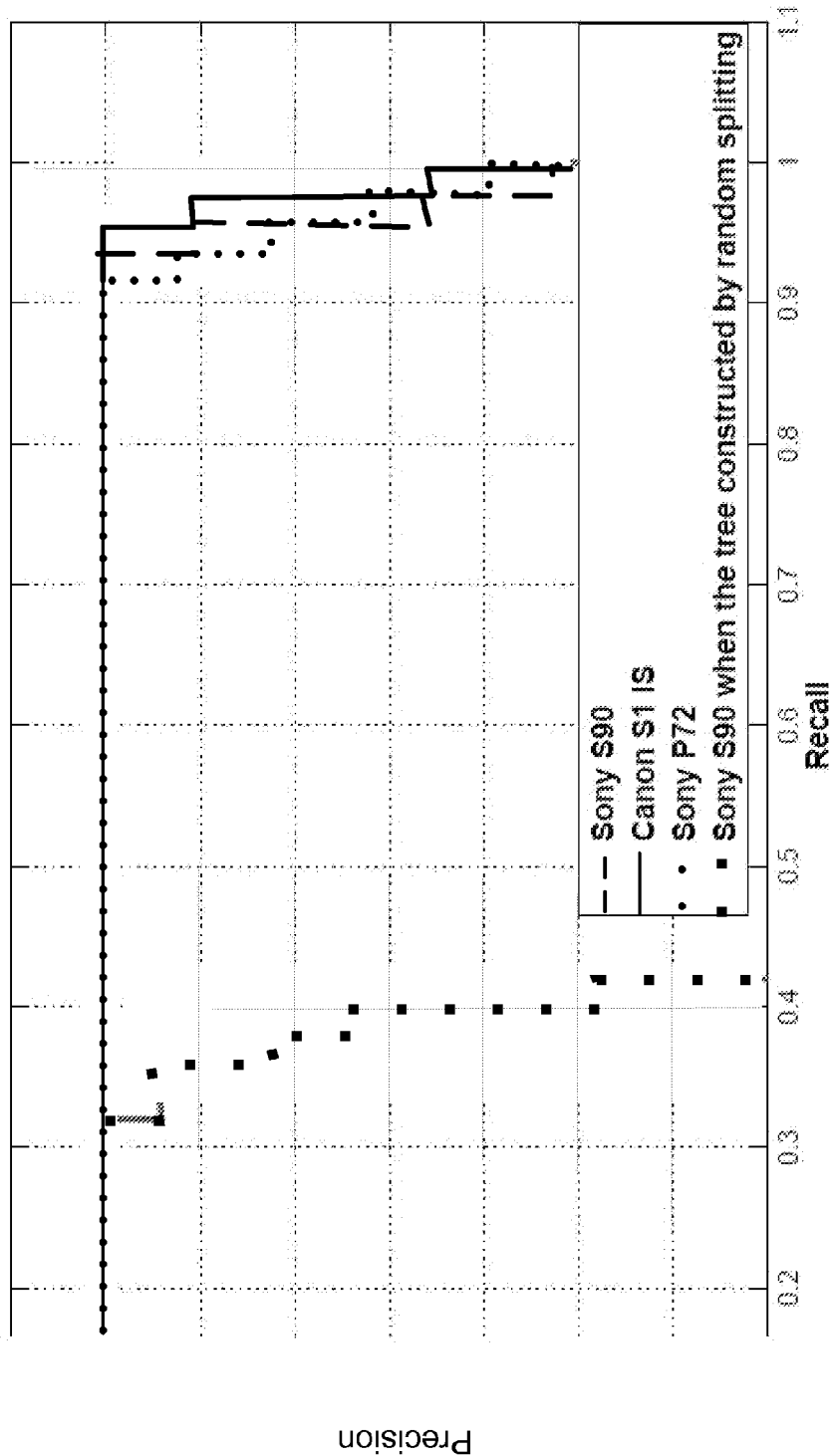
FIG. 8 is a graph illustrating the Precision-Recall relation for various cameras in an experiment using Group Testing with binary search trees.

In order to show how the proposed method can be used for retrieving multiple objects as described in §4.1.3, the same parameters used in the second experiment are used here. In this case, the tree is repeatedly updated until all the PRNU noises associated with the given cameras are identified. FIG. 8 shows the precision-recall diagrams for all the cameras that made an error during matching to show how many searches have to be performed. FIG. 8 indicates that the worst precision is about 0.5 which means that 100 searches, at most, are needed to find all the relevant PRNU noises in the database. In this experiment, a case the tree is built by splitting the PRNU noise estimates randomly is also demonstrated. FIG. 8 shows the Precision-Recall diagram after 100 searches where the fingerprint of Sony S90 is used in search over the database when the tree is constructed by random splitting. As expected above, the search accuracy with random splitting is inferior in comparison to structured case. This is primarily because when PRNU noise estimates are distributed over the nodes randomly, the distance between the node descriptors will not be far enough. As a result, PRNU noise estimates associated with a given node are more likely to be close to other node descriptors.

§4.3.1.3.4 Fourth Experiment

Figure 9:
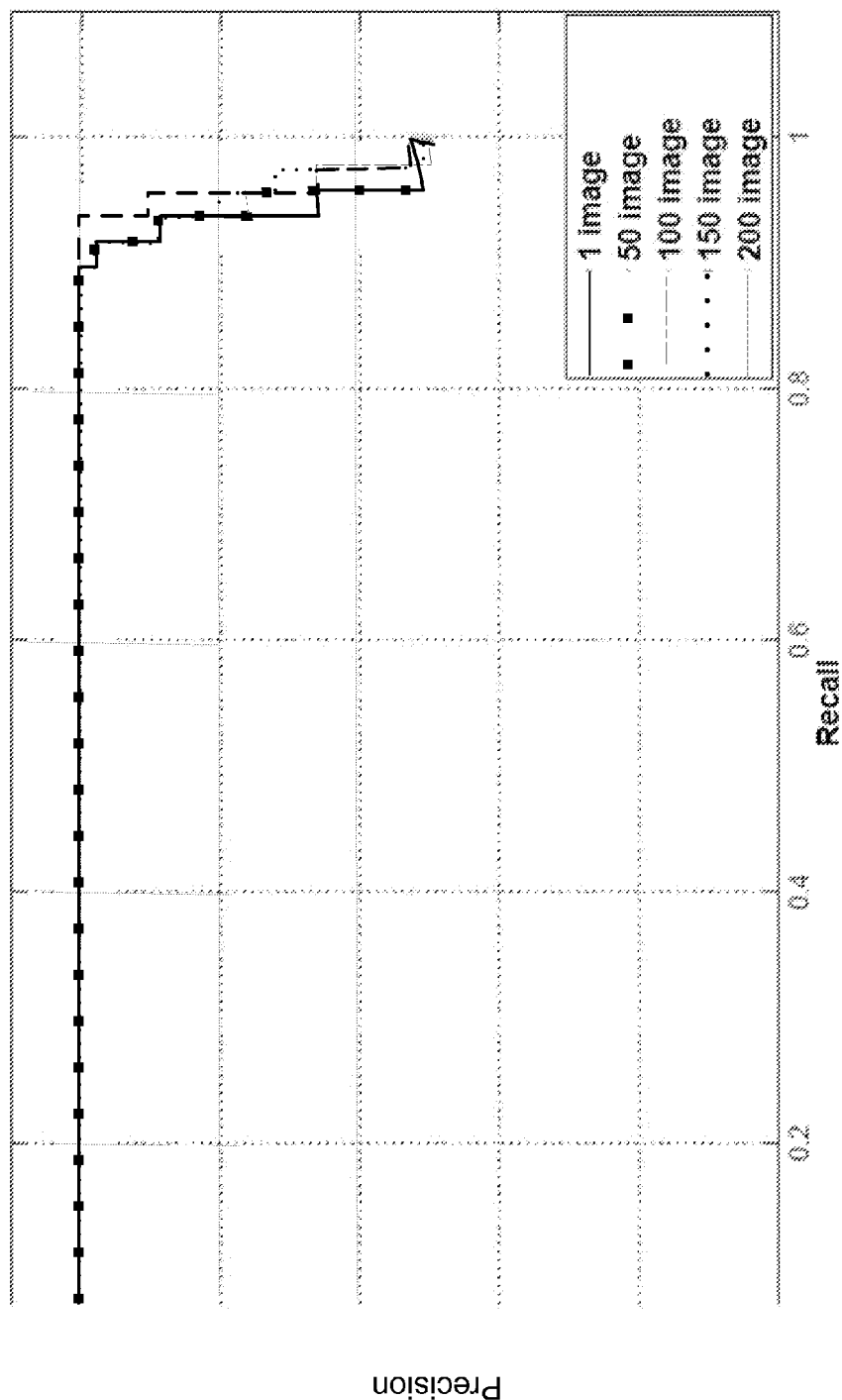
FIG. 9 is a graph illustrating the Precision-Recall relation for different numbers of images in an experiment using Group Testing with binary search trees.

In this experiment, the impact of device fingerprint's quality on the search results is investigated. For this purpose, the tree is constructed from 4096 PRNU noise estimates, 50 of which were due to Sony Powershot S90. Then four sensor fingerprints are generated for the Sony Powershot S90 by averaging 50, 100, 150 and 200 PRNU noise estimates coming from the same camera. In addition, to test the limits, a single PRNU noise estimate is used as the device fingerprint during the search. The Precision-Recall diagrams corresponding to the five different device fingerprints are presented in FIG. 9. Results show that performance does not change much with the number of PRNUs used when generating the device fingerprint. Note that even though a single PRNU estimate is used as the device fingerprint, this result was achieved because related PRNU noises were located in leaves of the tree which were close together which caused node descriptors to act almost as device fingerprints. Although results for one camera are presented, it was observed that performance was very similar with the other cameras as well.

§4.3.2 Nearest Neighbors and Locally Sensitive Hashing

The nearest-neighbor problem is one of the fundamental problems in computational geometry. Given N points $D=\{p_1, p_2, \ldots, p_N\}$ where $p_i \in R^n$, the nearest neighbor problem is to create a data structure so that given a query point $f \in R^n$, the point in D that is closest to f according to some distance function is returned. By constructing a data structure, it is possible to have a query take substantially less time than the naive method of simply computing the distance from the query point to all other points.

Variants of this basic idea include reporting the k-nearest neighbors to the query point, for some k, or to return all points that have distance less than some specified distance r to the query point.

§4.3.2.1 Using Nearest Neighbors to Find PNRU Matches

While the idea of nearest neighbor search originally was used for geometric data in low dimensions, it has also been of increasing utility by treating non-geometric objects, such as images, as high-dimensional points. In the multimedia source identification problem, each pixel in PRNU estimate of an image can be viewed as a dimension, and thus each PRNU estimate is an n-dimensional point. Given a set of N PNRU estimates, and a query fingerprint, finding the closest PNRU estimate to the query fingerprint can be solved by viewing all of these estimates as n-dimensional points and finding a PNRU estimate that corresponds to the closest point to the query point.

Nearest-neighbor techniques will treat each pixel as an orthogonal dimension. It does not model the proximity of individual pixels within an image. For example, if the noise pattern was just a few isolated hot pixels, if presented with a noise pattern that was identical but was shifted one pixel, the distance would be large and the match very poor. This sort of extreme sensitivity to a shift is usually very undesirable in image matching. However, in the present case, the PNRU noise appears at fixed locations on the sensor and is not subject to any translation. This makes the high dimensional distance functions used in nearest neighbors particularly well suited for detecting PNRU matches.

§4.3.2.2 Locality-Sensitive Hashing

Exact methods for nearest-neighbor search suffer from the curse of dimensionality, where no effective method is known when the data has very high dimensionality. However, it has been realized that by allowing small probabilities of error, the curse of dimensionality can be largely circumvented and high-dimensional data can be handled with relative ease.

Formally, given an error parameter $\delta>0$ and a distance parameter r, an approximate nearest neighbors structure will, for each point within a distance r of a query point f report it with probability at least $1-\delta$.

The main method for approximate nearest neighbor search in high dimensions is locality sensitive hashing ("LSH"). (See, e.g., Alexandr Andoni and Piotr Indyk, "Near-Optimal Hashing Algorithms For Approximate Nearest Neighbor In High Dimensions," *Proceedings of the 47th Annual IEEE Symposium on Foundations of Computer Science*, pages 459-468, Washington, D.C., USA, (2006), incorporated herein by reference). The technique of locality-sensitive hashing builds off of the notion of a locality-sensitive hash function. A set of hash functions H is said to be locality-sensitive for distance r if for any two points p and f, there are two probabilities $1>p_1>/p_2>0$ such that for a randomly chosen $h \in H$, if $d(p,f) \leq r$, $\Pr[h(p)=h(f)] \geq p_1$; else if $d(p,f) \geq cr$, $\Pr[h(f)=h(p)] \leq p_2$.

Given a family of H of locality-sensitive hash functions, $p_1$ and $p_2$ are typically very close together. Thus, a single hash function may be of little use. However, by using several hash functions from the family at the same time H, the difference between $p_1$ and $p_2$ can be magnified so that the probability or error can be brought down to a reasonable level. In LSH, two constants, k and/are defined so that each point is hashed with kl hash functions from H, using a two-level scheme. Specifically, pick/composite hash functions $g_i(x) = \langle h_{i,1}(x), h_{i,2}(x), \ldots h_{i,k}(x) \rangle$, where each of the h•,• is a random member of H. A separate traditional hash table is created for each $g_i$, all points thus are stored in l different hash tables, based on the values of $g_i(p)$, $1 \leq i \leq l$. A query on a point p is then executed by evaluating the l different $g_i(f)$ and obtaining from the traditional hash table all points p in the data set for some i have $g_i(p)=g_i(f)$. The distance is calculated to all of the potential matches, and only those that match the search criterion are returned. The constants k and l have the following effects: larger k reduces the number of false matches which must be eliminated as part of query; larger l reduces the error, i.e. the number of matches which did not match the query point on any of the hash functions.

In Datar, et al., the authors presented a new Hash family to be used in a high dimensional space which is generalized to arbitrary $l_p$ form for some $p \in (0, 2)$ distributions. (See Mayur Datar, Nicole Immorlica, Piotr Indyk, and Vahab S. Mirrokni, "Locality-Sensitive Hashing Scheme Based On P-Stable Distributions," *Symposium on Computational Geometry*, pages 253-262, (2004), incorporated herein by reference.) Since PRNU noise can be modeled as random variable with gaussian distribution, and the gaussian distribution is p−2 stable, $l_2$ norm can be used as a distance function for PRNU. There is a close relationship between $l_2$ norm and correlation. Actually, for two vector with unit norm $\|x\|=1$ and $\|y\|=1$, $l_2$ norm can be written as $\|x-y\|=\sqrt{2-2\rho(x,y)}$, where $\rho(x,y)$ is un-normalized correlation.

Another advantage of LSH is its theoretical soundness. Classes of locality-sensitive hash functions have been developed that have very good performance. For example, for Euclidian distance, a family of locality sensitive hash functions has been developed where the cost of a query tends to $O(N^{1/c^2})$, and exponents smaller then $1/c^2$ have been proven to be impossible. Thus, if nearest-neighbor is the proper way to model a problem, it would be difficult to engineer a solution that is fundamentally better than LSH.

§4.3.3 Clustering of PRNU Object Noises

Clustering of PRNU noises of objects captured by the same device into one single cluster has a significant effect on the efficiency and accuracy of the results. As mentioned above, the reliability of PRNU estimation increases with the number of objects used in its estimation process. Therefore, PRNU noise estimates of individual objects should not be stored in the system when there are multiple objects from the same device. Instead, the composite PRNU estimate should be stored. Such a strategy should give higher quality results as it will minimize the non-PRNU noise present, as well as reduce the number of noise estimates we are trying to compute a best-match with. Often combining data leads to efficiency gains at the cost of accuracy. However, embodiments consistent with the present invention gain performance and accuracy by appropriately consolidating objects.

To accomplish clustering, a similar methodology to the tree building scheme described above can be employed. To build the binary search tree we have used a divisive hierarchical clustering method. Here, the clusters are divided until all the clusters contain a single PRNU estimate. This procedure should be updated to accommodate a stop condition when a cluster contains PRNU estimates of a single device. In each step, all the entities in the cluster are correlated to the cluster center. Hence, one can decide when to stop based on these correlation values.

Another way of clustering would be to use nearest neighbor approach to determine the closest matches to each PRNU, and to merge the PRNU estimates with its closest match if they are within some threshold.

Alternately, clusters may be based on the observation that images that are harvested do not come in randomly. For example, if harvesting from an online photograph repository (such as Flickr®), one would gather images from each user, and within each user for each album, and in each album the images are in a certain order. When processing images in this order the camera used in the previous image is very likely to be used in the next image. Using this observation, the current image can be compared, not with the whole database of images seen so far, but rather with the most recent (or a small working set of) cluster that has been detected. This would work in a variety of settings, including social networking sites, corporate websites etc. In addition, available image (EXIF) headers can also be used to the greatest extent possible to aid the clustering process.

§4.3.3.1 Clustering Based on Common Class Properties of Devices

Some embodiments consistent with the present invention may use top down clustering using common class properties of images taken from the same type of device. In this way, if the clusters are uniformly distributed, the computational complexity can be reduced to $O(nN/C)$; where C is the number of clusters. Additionally, EXIF headers can be used to decide which device model is used to capture the object. However, since EXIF headers are not always available and/or reliable, content based model identification techniques can be used here.

§4.4 ALTERNATIVES, REFINEMENTS AND EXTENSIONS

§4.4.1 Threshold Use

As noted above, to make a decision as to whether a database contains an image associated with a query sensor fingerprint, a threshold is used to determine whether a match will be considered valid or invalid. However, setting such a threshold might lead to missed matches. Hence, the choice of threshold poses a trade-off between early termination the search (i.e., avoiding false positives during matching) and increased number of missed matches. Since the matching criteria is based on those presented in Lukas, supra, the threshold values presented in Lukas, supra and the corresponding false-positive rates can also be used with embodiments consistent with the present invention when selecting a value for threshold. Note that although the threshold is generally preset, it can be dynamically adjusted. For example, if enough data from a target source device exists, a more precise threshold can be determined and adjusted accordingly.

§4.4.1 Alternative Tree Building Schemes

Although a divisive hierarchical clustering based tree building scheme was described above which clustered the data from top to bottom, embodiments consistent with the present invention may use including agglomerative clustering which clusters the data from bottom to top. (See, e.g., Alberto Fernandez and Sergio Gomez, "Solving Non-Uniqueness In Agglomerative Hierarchical Clustering Using Multidendrograms," *CoRR, abs/cs/*0608049, (2006), incorporated herein by reference.)

§4.5 EXEMPLARY APPARATUS

Figure 10:
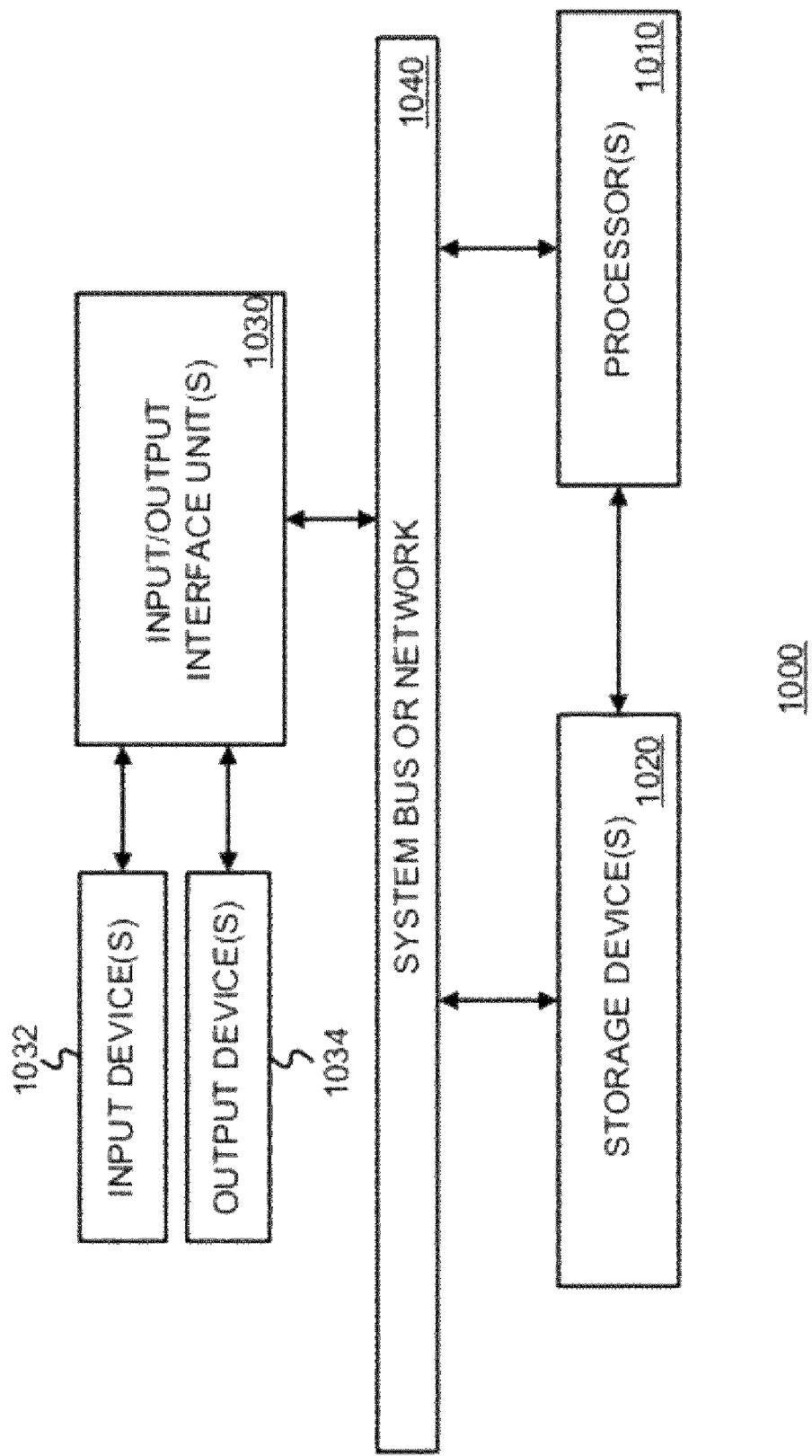
FIG. 10 is a block diagram of exemplary apparatus consistent with the present invention.

FIG. 10 is high-level block diagram of a machine 1000 which may perform one or more of the operations discussed above. Machine 1000 includes a processor(s) 1010, an input/output interface unit(s) 1030, a storage device(s) 1020, and a system bus(es) and/or a network(s) 1040 for facilitating the communication of information among the coupled elements. At least some of the storage device(s) have direct independent connections with the processor(s) which provide the storage device(s) exclusive access to the processor(s) as required. An input device(s) 1032 and an output device(s) 1034 may be coupled with the input/output interface(s) 1030. Operations of the present invention may be effected by the processor 1010 executing instructions (e.g., as software modules or components). The instructions may be stored in the storage device 1020 and/or received via the input/output interface 1030. The instructions may be functionally grouped into processing modules. Although not shown, more than one of some or all of these components may be provided.

Machine 1000 may be one or more networked computers for example. In an exemplary computer, the processor(s) 1010 may include a microprocessor, a network processor, and/or (e.g., custom) integrated circuits. In the exemplary computer, the storage device(s) 1020 may include one or more ROM, RAM, SDRAM, SRAM, SSRAM, DRAM, flash drive, hard disk drive, and/or flash card (or other non-transitory storage media). At least some of these storage device(s) 1020 may include program instructions defining an operating system, a protocol module (e.g. daemon) and/or other modules. In one embodiment, the methods of the present invention may be performed by a microprocessor executing stored program instructions (e.g., defining a part of the protocol module or daemon). At least a portion of the machine executable instructions may be stored (temporarily or more permanently) on the storage device(s) 1020 and/or may be received from an external source via an input interface unit(s) 1030.

Naturally, the operations of the exemplary methods may be performed on systems other than computers. Such other systems may employ different hardware and/or software.

§4.5 Conclusion

A novel scheme to improve the computational efficiency of the sensor fingerprint matching technique has been described. At least one approach described involves organizing a large database of media objects as a binary search tree so that the time needed to identify all media objects exhibiting the queried sensor fingerprint is reduced. The results of experiments presented show that when there are multiple images captured by the same camera in the database even if a single PRNU noise is used as the sensor fingerprint it yields reliable results.

What is claimed is:

1. A computer-implemented method for facilitating the identification of media objects exhibiting a device fingerprint produced by a target source device, the method comprising:
   a) receiving, by a computer system including one or more computers on network, a first set of media objects created by a plurality of source devices, each of the media objects including a device fingerprint produced by the source device which created the media object;
   b) determining, by the computer system, the device fingerprints for each of the media objects in the received first set of media objects;
   c) grouping, by the computer system, the device fingerprints determined for each of the media objects based on an analysis of the determined device fingerprints of the media objects, thereby defining groups of one or more device fingerprints;
   d) determining, by the computer system, a composite group fingerprint for each group of device fingerprints stored, wherein the composite group fingerprint of each group is determined using the one or more device fingerprints of the media objects which are members of the group; and
   e) storing, by the computer system, the groups of device fingerprints and the determined composite group fingerprint for each group on one or more storage devices.

2. The computer-implemented method of claim 1 further comprising:
   f) receiving, by the computer system, a second set of one or more media objects created by the target source device, each of the media objects in the second set of one or more media objects including a device fingerprint produced by the target source device which created the media object;
   g) determining, by the computer system, a query fingerprint of the target source device by analyzing the device fingerprints of the media objects in the second set of one or more media objects created by the target source device;

h) determining, by the computer system, a correlation between the query fingerprint of the target source device and each of the composite group fingerprints; and i) identifying, by the computer system, all media objects included in the first set of media objects whose device fingerprint matches the query fingerprint of the target source device using the determined correlations.

3. The computer-implemented method of claim 2, wherein the act of identifying all media objects included in the first set of media objects whose device fingerprint matches the query fingerprint of the target source device using the determined correlations includes 1) if the correlation between the query fingerprint of the target source device and a composite group fingerprint does not meet a threshold level,
  i) determining that the device fingerprint of a media object created by the target source device is not a member of the group of device fingerprints associated with the composite group fingerprint, and
  ii) eliminating all device fingerprints which are members of the group of device fingerprints associated with the composite group fingerprint from further testing; and 2) if the correlation between the query fingerprint of the target source device and a composite group fingerprint meets the threshold level,
  i) determining that the device fingerprint of a media object created by the target source device is a member of the group of device fingerprints associated with the composite group fingerprint, and
  ii) performing further testing on the device fingerprints which are members of the group of device fingerprints associated with the composite group fingerprint.

4. The computer-implemented method of claim 3, wherein further testing is performed and includes
  i) determining that a correlation between the query fingerprint of the target source device and an individual device fingerprint indicates a match, and
  ii) identifying the media object associated with the matching individual device fingerprint as being a media object created by the target source device.

5. The computer-implemented method of claim 2, wherein the act identifying all media objects included in the first set of media objects whose device fingerprint matches the query fingerprint of the target source device includes using locality sensitive hashing ("LSH") to identify the media objects.

6. The computer-implemented method of claim 1, wherein a device fingerprint is a source device characteristic within the media object produced by the source device that created the media object and which helps identify the source device.

7. The computer-implemented method of claim 6, wherein the source device characteristic is a Photo Response Non-Uniformity ("PRNU") noise signal within the media object produced by a sensor of the source device that created the media object.

8. The computer-implemented method of claim 7, wherein the sensor is a charge-coupled device ("CCD"), and wherein the PRNU noise signal within the media object is caused by impurities in silicon wafers of a CCD included in the source device used to create the media object.

9. The computer-implemented method of claim 6, wherein the source device characteristic is at least one of (A) a dust pattern on the source device lens, (B) a sensor watermark intentionally created by a source device manufacturer, or (C) a post processing technique used by the source device.

10. The computer-implemented method of claim 9, wherein the source device characteristic is a post processing technique used by the source device, and wherein the media object post processing technique includes at least one of (i) a demosaicing technique, (ii) a compression technique, (iii) a color interpolation technique, (iv) a gamma correction technique, (v) a white point correction technique, or (vi) a color conversion technique.

11. The computer-implemented method of claim 1, wherein the groups of device fingerprints stored are grouped based on one or more common characteristics shared by the media objects which are member of the group.

12. The computer-implemented method of claim 1, wherein the act of storing the groups of the device fingerprints stores the device fingerprints in a N-ary search tree.

13. The computer-implemented method of claim 12, wherein the N-ary search tree is created using hierarchical divisive clustering.

14. The computer-implemented method of claim 12, wherein the act of creating the N-ary search tree includes
  1) storing, by the computer system, a composite group fingerprint in a node of the N-ary search tree;
  2) determining, by the computer system, a correlation between each individual device fingerprint of each media object and the composite group fingerprint stored in node;
  3) sorting, by the computer system, the determined correlations;
  4) dividing, by the computer system, the sorted determined correlations into two or more subgroups;
  5) determining, by the computer system, a composite group fingerprint of each subgroup using the device fingerprints of the media objects which are members of the subgroup; and
  6) if the divided subgroups contain two or more determined correlations, then repeating steps 1 though 5 at least once.

15. The computer-implemented method of claim 12, wherein the N-ary search tree is created using agglomerative clustering.

16. The computer-implemented method of claim 1, wherein the act of storing groups of the device fingerprints determined for each of the media objects in the received first set of media objects on one or more storage devices stores the device fingerprints using locality sensitive hashing ("LSH").

17. The computer-implemented method of claim 1, wherein the act of storing groups of the device fingerprints determined for each of the media objects in the received first set of media objects on one or more storage devices stores the device fingerprints using clustering based on at least one of (A) common class properties of media objects created from a same type of source device, (B) EXIF headers of media objects, and (C) a location from which the media objects were obtained from.

18. The apparatus of claim 17 further comprising:
  6) receiving a second set of one or more media objects created by the target source device, each of the media objects in the second set of one or more media objects including a device fingerprint produced by the target source device which created the media object;
  7) determining a query fingerprint of the target source device by analyzing the device fingerprints of the media objects in the second set of one or more media objects created by the target source device;
  8) determining a correlation between the query fingerprint of the target source device and each of the composite group fingerprints, the determined correlations being used to determine if a device fingerprint of a media object created by the target source device is a member of the group of device fingerprints associated with the composite group fingerprint; and 9) identifying all media objects included in the first set of media objects whose device fingerprint matches the query fingerprint of the target source device using the determined correlations.

19. Apparatus for facilitating the identification of media objects exhibiting a device fingerprint produced by a target source device, the apparatus comprising:
- a) at least one processor;
- b) at least one input device; and
- c) one or more storage devices storing program instructions which, when executed by the at least one processor, performs a method including
  1) receiving a first set of media objects created by a plurality of source devices, each of the media objects including a device fingerprint produced by the source device which created the media object;
  2) determining the device fingerprints for each of the media objects in the received first set of media objects;
  3) grouping the device fingerprints determined for each of the media objects based on an analysis of the determined device fingerprints of the media objects, thereby defining groups of one or more device fingerprints;
  4) determining a composite group fingerprint for each group of device fingerprints stored, wherein the composite group fingerprint of each group is determined using the one or more device fingerprints of the media objects which are members of the group; and
  5) storing the groups of device fingerprints and the determined composite group fingerprint for each group on one or more storage devices.

\* \* \* \* \*